Figure 1:
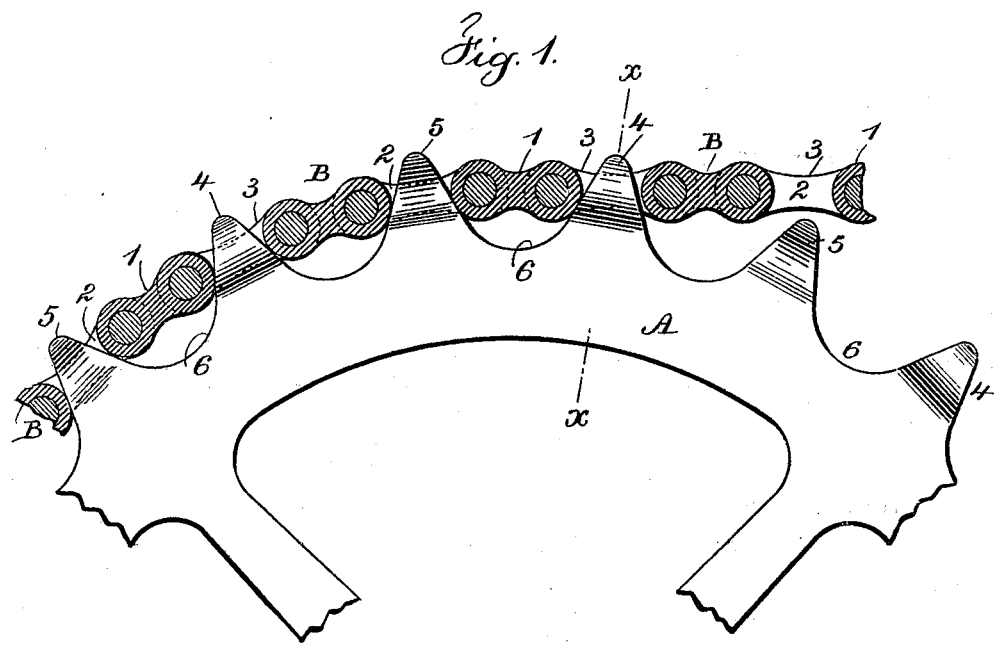

No. 619,537. Patented Feb. 14, 1899.
G. W. BUFFORD.
SPROCKET WHEEL FOR CYCLE CHAINS.
(Application filed May 2, 1898.)

(No Model.)

Witnesses
Chas H. Smith
J. Staib

Inventor
George W. Bufford
by L. W. Serrell & Son
Attys

THE NORRIS PETERS CO., PHOTO-LITHO., WASHINGTON, D. C.

UNITED STATES PATENT OFFICE.

GEORGE W. BUFFORD, OF NEW YORK, N. Y.

SPROCKET-WHEEL FOR CYCLE-CHAINS.

SPECIFICATION forming part of Letters Patent No. 619,537, dated February 14, 1899.

Application filed May 2, 1898. Serial No. 679,463. (No model.)

*To all whom it may concern:*

Be it known that I, GEORGE W. BUFFORD, a citizen of the United States, residing at New York, (Brooklyn,) in the county of Kings and State of New York, have invented an Improvement in Sprocket-Wheels for Cycle-Chains, of which the following is a specification.

In cycles it has been common to employ a sprocket-wheel around the crank-shaft and a chain leading from the same to a smaller sprocket-wheel upon the hub or axle of the rear wheel. These sprocket-wheels have been of various diameters, and the chains have also been constructed with links of different sizes and shapes; but one of the most common chains is formed with side plates or links and intermediate single links, so that the projections upon the sprocket-wheels come at the ends of the intermediate links and between the side plates or links. In practice it has been found that the projections or teeth upon the sprocket-wheel do not wear with uniformity, and a looseness results between the sprocket-wheel and the chain. In addition to the foregoing it frequently happens that mud and other earthy materials lodge upon the chain or upon the sprocket-wheel, and they become firmly embedded upon the periphery of the sprocket-wheel between one projection and the next. Hence the chain is tightened and the parts exposed to unnecessary friction. Furthermore, the sprocket-wheels heretofore constructed add considerable weight to the cycle.

The objects of the present invention are to lessen the weight of the sprocket-wheel, to unify the wear upon the chain and upon the sprocket projections, and to prevent inconvenience or friction from mud or earthy materials lodging upon the sprocket-wheel. With these objects in view I make the sprocket wheel considerably thinner than the width of the space between the one plate-link and the next, so that the sprocket-wheel is as light as consistent with the necessary strength, and the teeth or projections upon the sprocket-wheel are bent out laterally and in alternate positions, so that one tooth is bent in one direction and the next tooth in the other direction, and the bends upon the sprocket-teeth cause such teeth to fill or nearly fill the spaces in the chain between the plate-links, and hence as one sprocket-tooth is bent one way and the next tooth is bent the other way the tension upon the chain is unified by the bearings of the teeth of the sprocket alternating first to one side and then to the other side against the chain. In addition to the foregoing the sprocket-wheel, being narrow, gives but little surface for the lodgment of earthy materials upon the periphery, and the pressure and alternate bearing first one way and then the other way displace any earthy materials, so that they fly off, and I recess the periphery of the sprocket-wheel between one projection and the next, so that the bearing of the chain upon the sprocket-wheel is at the base of each projection and not along upon the periphery of the wheel itself. By the foregoing the sprocket-wheel is made much lighter, the wear is unified both upon the sprocket-wheel and upon the chain, and the risk of obstruction or injury is reduced to a minimum.

Figure 2:
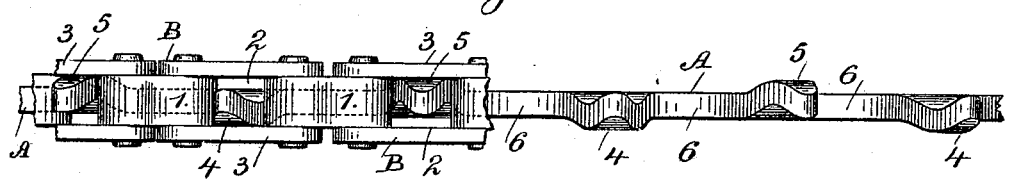
Figure 3:
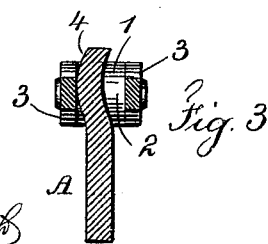

In the drawings, Figure 1 is a side view of a sprocket-wheel, showing also a portion of a chain resting against the same. Fig. 2 is a plan view of the sprocket-wheel and of a portion of a chain, whereby the respective positions of the sprocket projections and the links of the chain are indicated; and Fig. 3 is a section at the line *x x* of Fig. 1.

The sprocket-wheel A is of any desired size, and the thickness of the same is much less than the space 2 between the links 3 3 of the chain B in order that the sprocket-wheel may be as thin and light as consistent with the necessary strength.

The teeth 4 of the sprocket-wheel are bent so as to project at one side of the sprocket-wheel, and the teeth 5 are similarly bent so as to project at the other side of the sprocket-wheel, so that when the teeth 4 and 5 engage the chain B the outer surfaces of the respective teeth are closely adjacent to the inner surfaces of the links 3 of the chain, the opposite sides of the teeth being distant from the inner surfaces of the links of the chain, so that the teeth 4 bear toward one side of the chain and the teeth 5 toward the other side of the chain, and these alternating insure regularity in the wear of the surfaces that contact, and the bases of the teeth 3 and 4 extend in the spaces 2 between the single links 1 1, so that the said links 1 1 bear upon the bases of the teeth 4 and 5, and the peripheral portions of the sprocket-wheel between the teeth are made concave, as represented at 6, so that mud or other earthy material that may fall upon the periphery of the sprocket-wheel does not tighten the chain or produce friction; but such foreign substance is displaced and caused to drop by the action of the chain.

The size of the sprocket-wheel is immaterial, and so, also, is the manner in which the sprocket wheel or ring is fastened to the shaft or other device carrying such sprocket wheel or ring.

The lateral bends at the bases of the teeth or projections may extend more or less into the rim of the sprocket-wheel, the bend of one tooth and its base being in one direction and that of the next tooth in the other direction.

I claim as my invention—

1. The combination with the chain having plate-links and intermediate single links, of a sprocket-wheel that is thinner than the distance between the plate-links of the chain, the projecting teeth of the sprocket-wheel being bent outward and in alternate opposite directions, so as to bear against the chain directly adjacent to the plate-links thereof and alternately, for unifying the action of the parts and admitting of a light weight of the sprocket-wheel, substantially as set forth.

2. The combination with the chain having plate-links and intermediate single links, of a sprocket-wheel that is thinner than the distance between the plate-links of the chain, the projecting teeth of the sprocket-wheel being bent outward and in alternate opposite directions, so as to bear against the chain directly adjacent to the plate-links thereof and alternately, for unifying the action of the parts and admitting of a light weight of the sprocket-wheel, the peripheral portions of the sprocket-wheel between one projection and the next being concave so as not to bear against the chain, substantially as set forth.

3. A sprocket-wheel having teeth, the central portions of which between the root and crown are bent outwardly in opposite directions on alternate teeth, thereby affording an effectively greater bearing-surface than the thickness of the body of the wheel, substantially as described.

Signed by me this 28th day of April, 1898.

GEORGE W. BUFFORD.

Witnesses:
B. WEPPLER,
JOHN KITSON.